US012037804B2

(12) United States Patent
Spangler et al.

(10) Patent No.: US 12,037,804 B2
(45) Date of Patent: Jul. 16, 2024

(54) IN-AIRPORT GUITAR KIOSK AND RELATED METHODS

(71) Applicant: Ciari Guitars, Inc., San Diego, CA (US)

(72) Inventors: Jonathan Spangler, San Diego, CA (US); G. Bryan Cornwall, Poway, CA (US); Thomas Benson, Laguna Beach, CA (US)

(73) Assignee: Ciari Guitars, Inc., San Diego, CA (US)

( * ) Notice: Subject to any disclaimer, the term of this patent is extended or adjusted under 35 U.S.C. 154(b) by 0 days.

(21) Appl. No.: 18/104,229

(22) Filed: Jan. 31, 2023

(65) Prior Publication Data

US 2023/0323688 A1 Oct. 12, 2023

Related U.S. Application Data

(63) Continuation of application No. 17/708,176, filed on Mar. 30, 2022, now Pat. No. 11,566,436, which is a continuation of application No. 16/830,252, filed on Mar. 25, 2020, now Pat. No. 11,306,498.

(60) Provisional application No. 62/823,646, filed on Mar. 25, 2019.

(51) Int. Cl.

| | |
|---|---|
| ***E04H 1/12*** | (2006.01) |
| ***A47C 11/00*** | (2006.01) |
| ***A47F 3/00*** | (2006.01) |
| ***G10G 5/00*** | (2006.01) |

(52) U.S. Cl.

CPC .............. *E04H 1/12* (2013.01); *A47C 11/005* (2013.01); *A47F 3/001* (2013.01); *E04H 1/125* (2013.01); *G10G 5/00* (2013.01)

(58) Field of Classification Search

CPC ....... E04H 1/12; E04H 1/1272; E04H 1/1222; A47C 11/005; A47F 3/001; A47F 3/005; G10G 5/00

USPC .................................................. 52/36.1, 36.2

See application file for complete search history.

(56) References Cited

U.S. PATENT DOCUMENTS 7,090,313 B1* 8/2006 McMurray .............. A47F 3/005 312/138.1
2015/0122960 A1* 5/2015 Eward ...................... G10G 5/00 248/231.91
2018/0228285 A1* 8/2018 Grannis ............... A47B 13/081
2018/0376225 A1* 12/2018 Jones .................... G10H 1/368

* cited by examiner

*Primary Examiner* — Mark R Wendell

(74) *Attorney, Agent, or Firm* — Jonathan D. Spangler; Jay B. Bell

(57) ABSTRACT

An in-airport guitar kiosk and related methods for allowing air travelers an opportunity to relax and play guitar before or after flights (to improve the passenger journey) as well as the opportunity to try a novel travel guitar uniquely suited for air travel.

20 Claims, 10 Drawing Sheets

IN-AIRPORT GUITAR KIOSK AND RELATED METHODS

CROSS-REFERENCES TO RELATED APPLICATIONS

The present application is a continuation of U.S. patent application Ser. No. 17/708,176, filed on Mar. 30, 2022 (issued as U.S. Pat. No. 11,566,436 on Jan. 31, 2023), which is a continuation of U.S. patent application Ser. No. 16/830,252, filed on Mar. 25, 2020 (issued as U.S. Pat. No. 11,306,498 on Apr. 19, 2022), which claims priority to U.S. Provisional Patent App. Ser. No. 62/823,646, filed Mar. 25, 2019, the entire contents of which is hereby expressly incorporated by reference into this disclosure as if set forth fully herein.

FIELD

The present disclosure relates generally to guitars and, more particularly, to an in-airport guitar kiosk and related methods for allowing air travelers an opportunity to relax and play guitar before or after flights (to improve the passenger journey) as well as the opportunity to try a novel travel guitar uniquely suited for air travel.

BACKGROUND

Guitars have enjoyed among the highest popularity among musical instruments. A perennial challenge with guitar ownership is air travel, owing to the large size of guitars compounded by limited overhead bin space and ever-increasing carry-on restrictions for guitarists and non-guitarists alike. For guitarists, this creates over 70 M annual pain points in the US alone based on 2.6 M daily enplanements per day multiplied by the percentage of people who play guitar (7.5%). The pain points include: (1) if checked as luggage, the risk of damage or loss during baggage handling and plane transfers; (2) if toted as a carry-on, the stress, anxiety and uncertainty as to whether bin space will be available, as well as drawing the ire of fellow passengers when you take up a full bin—causing them to gate check their carry-on luggage; (3) the added expense of guitar air travel, which includes: (a) checking luggage, as most people travel with a roller bag for clothes and a personal item/bag for computer or laptop such that adding a guitar will put them over the "1 carry-on and 1 personal item" limit for most airlines; and (b) paying extra for early or priority seating, which is required while traveling with a guitar in order to increase the odds of finding overhead bin space for that flight; and (last but not least) (4) leaving your guitar at home during air travel due to pain points (1)-(3), which robs the guitarist (and others) of the use and enjoyment of guitars during trips (work or pleasure) involving air travel.

As evidenced in the USA Today article "The Grind of Air Travel: Where Did It All Go Wrong" (Sep. 15, 2014), air travel has become increasingly stressful for most travelers. A host of factors influence this, including (but not limited to): (1) transit to the airport, such as from the uncertainty of traffic or public transportation or obtaining ride share service to the airport: (2) TSA security, such as the uncertainty of long lines, secondary screening, and losing articles in screening; (3) in-airport transit to the gate, such as uncertainty and exertion of long walks or additional train transit in order to get to your gate; (4) in-airport boredom during delays or long lay-overs; and (5) in-flight stress from cramped seating, overhead bin restrictions, "nickel and dime" fees for previously free services.

The present invention is directed at destressing air travelers, particularly air travelers who are among the 7.5% of the US population who play guitar and the 7.5% of the US population who are interested in taking up (learning to play) the guitar. By "guitar", this includes electric guitars, acoustic guitars, and bass guitars. It will also serve to destress non-guitarist air travelers in multiple ways, which will be discussed herein.

SUMMARY

The present invention accomplishes this goal by providing an in-airport kiosk with one or more guitar play stations for air travelers to play a specially designed travel guitar before or after flight. The in-airport travel guitar kiosk of the present invention serves several important functions. First, it provides guitarists and those interested to learn guitar an opportunity to play guitar while in the airport (e.g., post security) so they can relax before or after their flight and minimize or eliminate the stress level that would otherwise occur due to the current air travel experience. Second, it provides guitarists and those interested to learn guitar an opportunity to try a specially designed travel guitar, which if purchased or rented would allow them to air travel without experiencing the guitar air travel pain-points set forth above, owing to the ability of the specially designed travel guitar to fit in a normal sized backpack that can be stored under seat or in the overhead bin. Third, it has the downstream effect of removing a stressor for other passengers because, as more guitarists learn about and purchase or rent and air travel with the specially designed travel guitars, more overhead bin space will be available for carry-on luggage of non-guitarists (because fewer guitarists will air travel with their traditional guitars).

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein.

DETAILED DESCRIPTION OF A PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The in-airport guitar kiosk disclosed herein boasts a variety of inventive features and components that warrant patent protection, both individually and in combination.

Figure 1B:
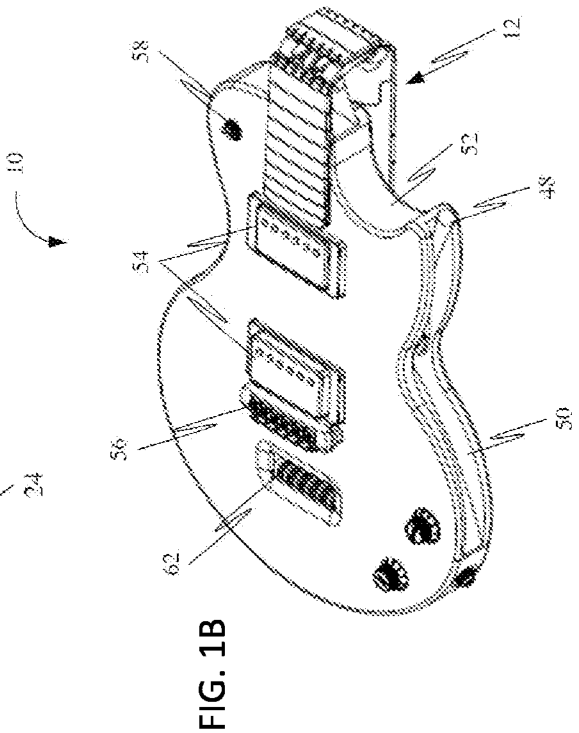
FIGS. 1A-1B are perspective views of a travel guitar (unfolded and folded, respectively) specifically designed to fit in a backpack for convenient air travel, which is an example of a type of guitar for use with the in-airport guitar kiosk of the present invention.
Figure 1A:
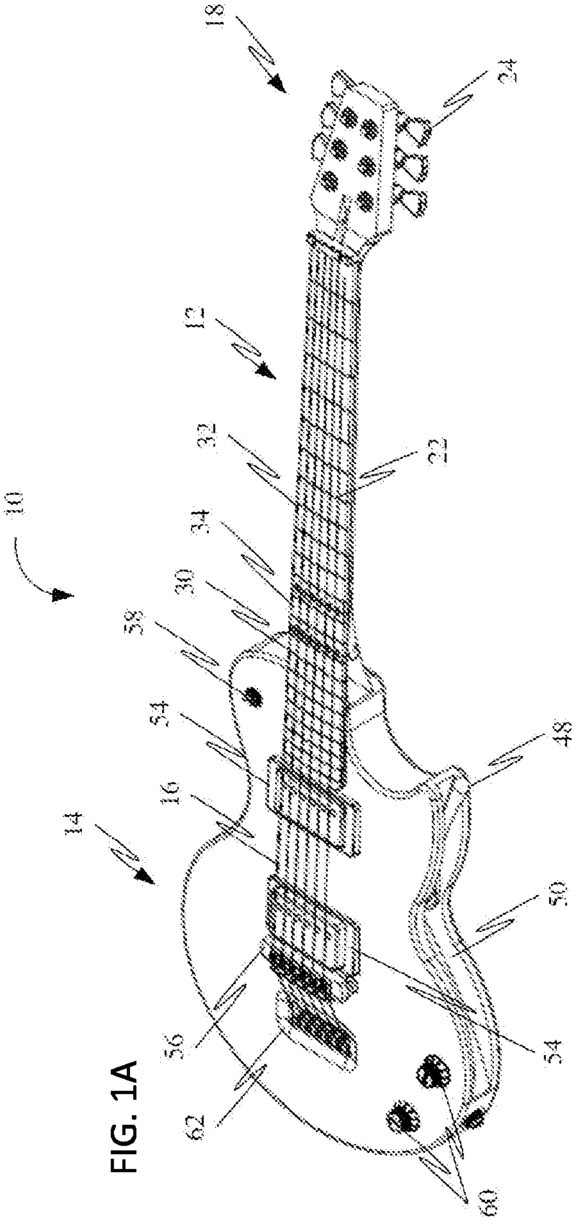

FIGS. 1A-1B show a foldable travel guitar 10 in both a straight, playing configuration (FIG. 1A) and folded, travel configuration (FIG. 1B). The travel guitar 10 specifically designed to fit in a backpack for convenient air travel, which is an example of a type of guitar for use with the in-airport guitar kiosk of the present invention. The guitar 10 shown, when folded, fits in a backpack that is sized and dimensioned to be stored underneath the seat of an air traveler on most commercial airplanes, for example, Boeing 737 airplanes. The electric guitar 10 includes a neck 12 and a body 14. The neck 12 includes a headstock 18 and (most notably) a 3-part hinge assembly that creates a lower neck portion 30, an upper neck portion 32 and a middle neck portion 34 each having a plurality of frets 22. A plurality of guitar strings 16 extend from tuning machines 24 on the headstock 18 and pass over the upper surface of the neck 12, a bridge 56, and a string roller 62 before terminating at a floating tail piece (not shown) disposed within a recess on the back of the body 14. In use, a player of the guitar 10 can create any of a variety of musical notes by depressing the various strings 16 between the various frets 22 as known in the art. The 3-part hinge of the neck 12 can be selectively locked and unlocked via a handle 48 disposed within a side channel 50 in the body 14. When unlocked, an actuator (not shown) coupled to the handle 48 serves to automatically loosen the strings 16 (to approximately 3 lbs. of tension) and unlock the hinge in the neck 12 such that the guitar 10 can be folded as shown in FIG. 1B. To play again, the user need only straighten the neck 12 (FIG. 1A) and rotate the handle 48 to automatically lock the hinge in the neck 12 and return to the strings 16 to full tension so it can be "top off" tuned and played. The guitar 10 includes a number of standard components, such as (but not limited to) neck and bridge pick-ups 54, 56, a pick-up selector switch 58, volume and tone knobs 60, and tuning machines 24 on the headstock 18.

Although the in-airport kiosk described herein is uniquely suited for the guitar 10 of FIGS. 1A-1B (given the air travel focus), it will be appreciated and within the scope of the present invention to display and/or use any number of other types of fretted instruments, including but not limited to traditional electric guitars, traditional acoustic guitars, traditional bass guitars, banjos, ukuleles, mandolins, etc. It is also within the scope of the present invention to display and/or use any number of other types of non-fretted instruments in the in-airport kiosk(s) disclosed herein, including but not limited to keyboards, silent drum kits, etc. In such embodiments, the in-airport kiosks disclosed herein may be more aptly described as an "in-airport experiential music" kiosk and may include any combination of fretted instruments and non-fretted instruments.

Figure 2:
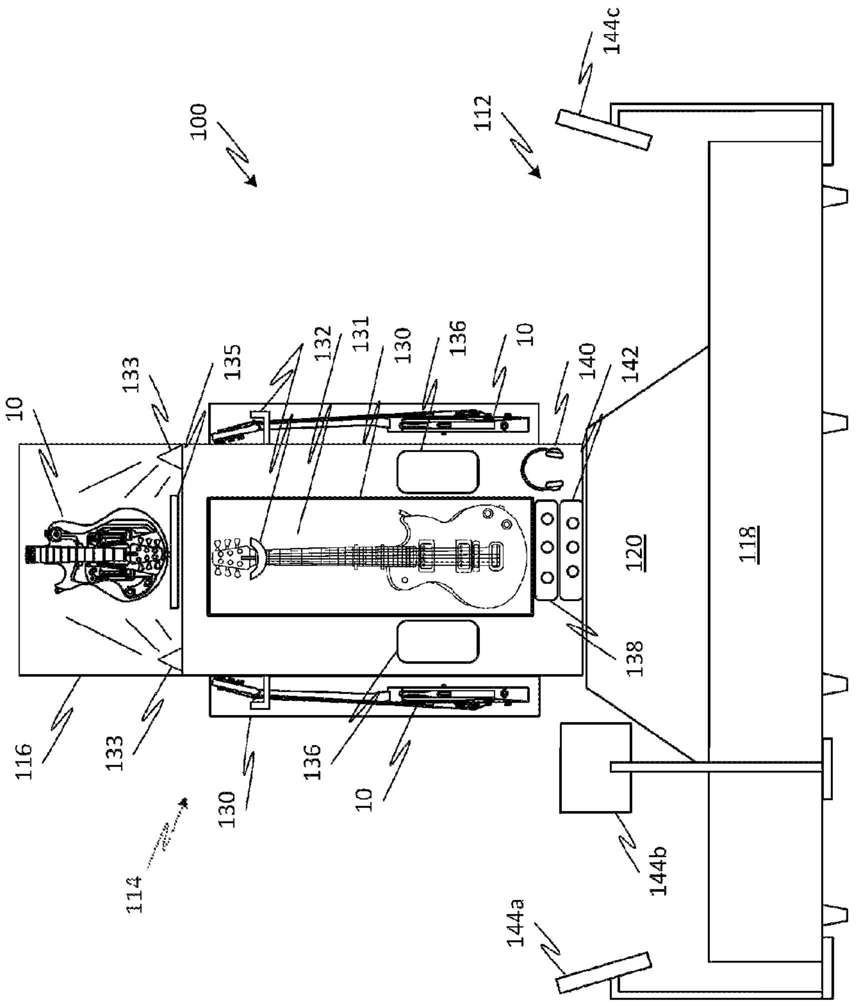
FIG. 2 is a front view of an in-airport guitar kiosk according to an aspect of the present invention, illustrating an exemplary guitar play station.
Figure 3:
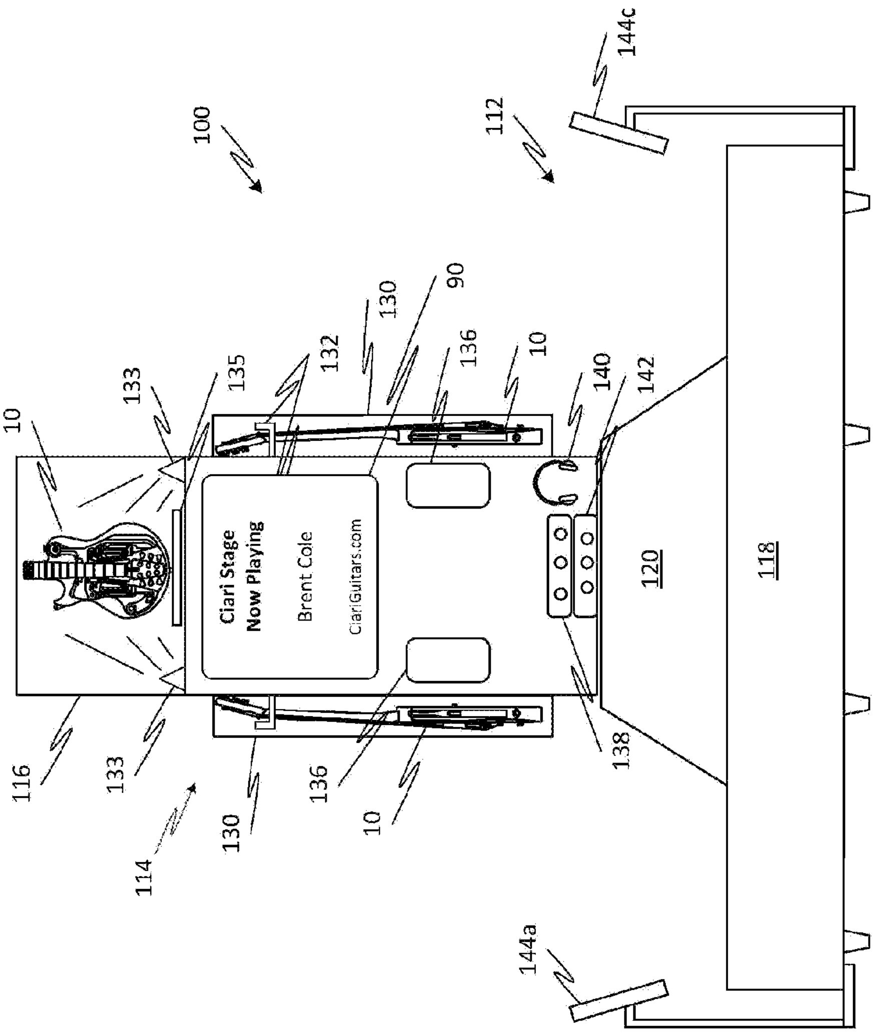
FIG. 3 is a front view of an in-airport guitar kiosk of the type shown in FIG. 2, illustrating an exemplary media and stage station according to an aspect of the present invention.
Figure 4:
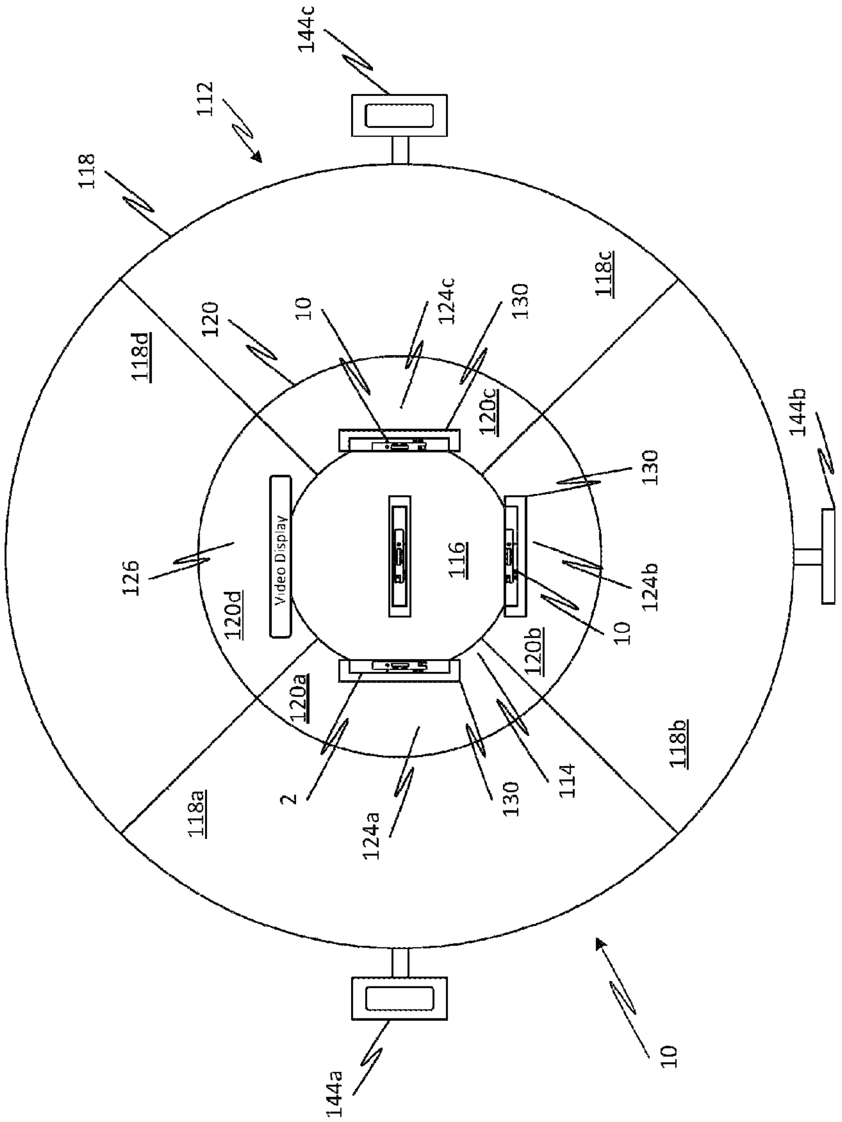
FIG. 4 is a top view of an in-airport guitar kiosk of the type shown in FIGS. 2-3, illustrating three (3) guitar play stations and one (1) media and stage station according to an aspect of the present invention.
Figure 5:
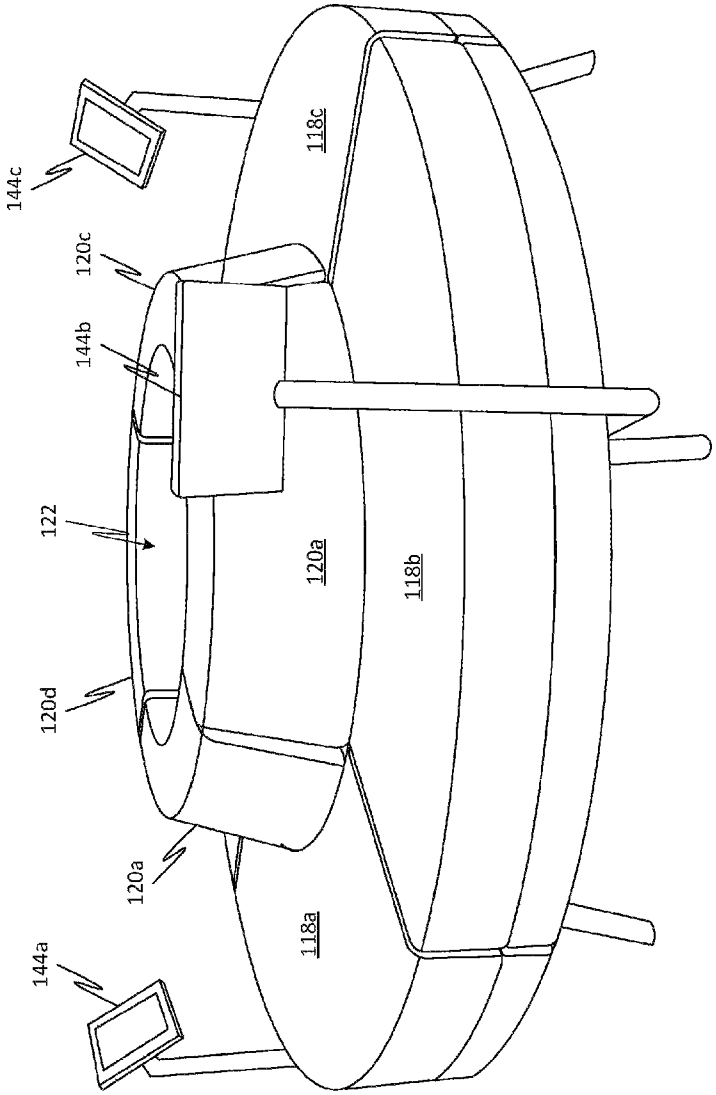
FIGS. 5 and 6 are perspective and top views of the circular seating structure shown in FIGS. 2-3, including a central void dimensioned to receive the guitar tower shown in FIGS. 2-4 according to an aspect of the present invention.
Figure 6:
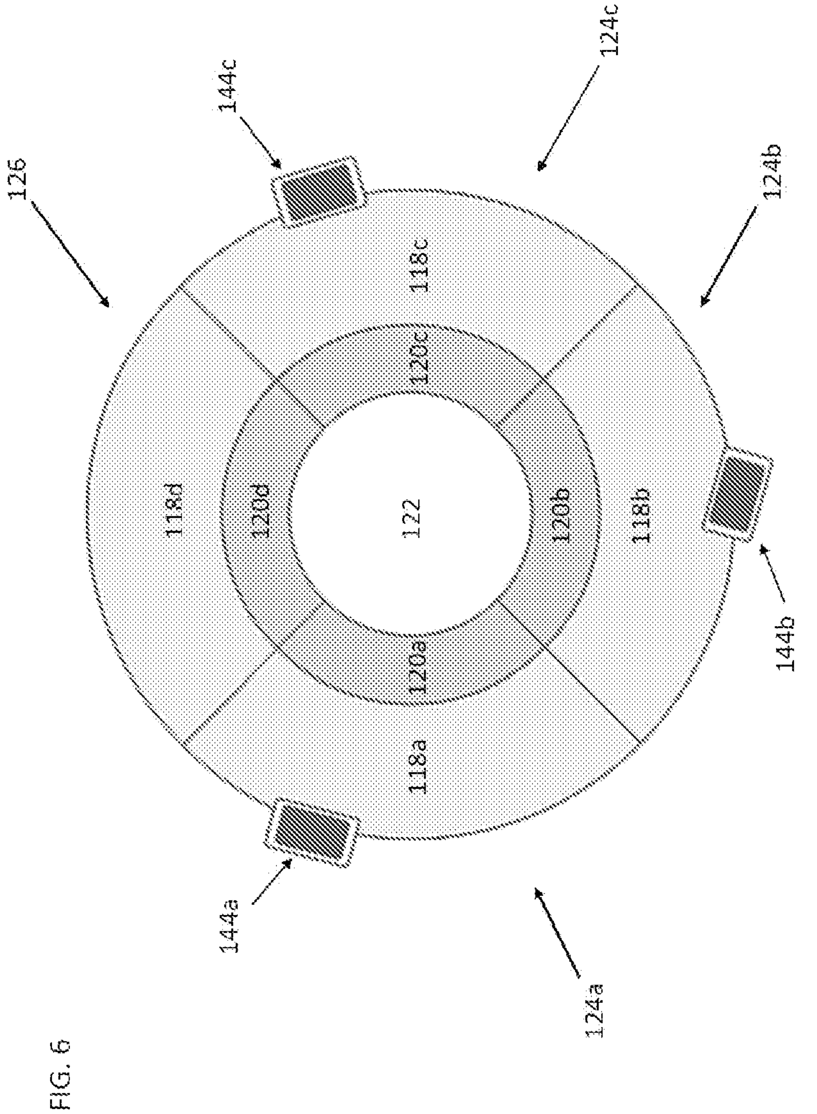

FIGS. 2-4 illustrate an exemplary in-airport guitar kiosk 100 according to various aspects of the present invention. The in-airport guitar kiosk 100 includes (by way of example only) a circular seating structure 112 and a guitar tower 114 having an optional top display case 116. The circular seating structure 112 (as best shown in FIGS. 5-6) includes a seat 118 (with seating quadrants **118*a*-118*d*), an optional backrest 120 (with backrest quadrants 120*a*-120*d*), and a central void 122 dimensioned to receive or otherwise mount the guitar tower 114** in a structurally sound manner.

The in-airport guitar kiosk 100 includes (by way of example only) three (3) guitar play stations **124*a*-124*c* (best viewed in FIGS. 2 and 4), as well as an optional stage/media station 126 (best viewed in FIGS. 3 and 4). The play stations 124*a*-124*b* are primarily for silent use of the guitar 10, such as via headphones 140 (wireless or wired). The stage/media station 126 includes a video monitor 90 and is primarily for use as a stage for a customer to perform with a guitar 10 while capturing video and/or audio, which can be shared with the customer post-performance as a manner of garnering goodwill and driving enthusiasm for and awareness of the guitar kiosk 100 of the present invention and the airport where it's located. The in-airport guitar kiosk 100 is preferably located post-security, at or near the boarding gates, and thus offers a convenient, comfortable, and relaxing environment for air travelers to play guitar before or after their flights. This is accomplished by providing not only multiple guitars 10, but also a variety of other features and functionality for listening to and controlling the output of the guitars 10 for optimal play within the specific context of an airport. By way of example only, these features and functions can include (but are not limited to) speakers 136, a control panel 138, headphones 140, an input/output (I/O) panel 142, and a computer 144** (such as an iPad, tablet computer, etc.).

The speakers 136 are capable of projecting sound (e.g., amplified guitar sounds and/or backing tracks and/or vocals) to the player and anyone in the near vicinity of the given play station 124 or stage/media station 126. This may be advantageous in multiple instances, such as when artists are invited to play at the in-airport guitar kiosk 100 of the present invention (e.g., in collaboration with the airport arts program). In some instances, it may be desired to have multiple artists play at the same time, such as by: a) plugging more than one artist into a single play station **124*a*-124*c* or the stage/media station 126; and/or b) having an individual performer at multiple stations 124, 126. In either case, the multiple artists can use the guitar kiosk 100** to collaborate and make music, jam, etc., with any of a number of instruments, including but not limited to guitars, microphones (for vocals), piano, electronic drum kit, Cajon, etc. This may be accomplished in any of a variety of suitable manners, including but not limited to incorporating the features of U.S. Pat. No. 9,767,778 entitled "Systems for Combining Inputs from Electronic Musical Instruments and Devices," the entire content of which is hereby incorporated by reference as if set forth fully herein.

The control panel 138 may include a variety of knobs or adjustments (e.g., volume, tone, balance) for controlling various aspects of the audio associated with the in-airport guitar kiosk 100. The control panel 138 is connected to an amplifier and/or electronics configured to receive an input signal from the guitar 10, amplify and/or condition the signal, and transmit the output to any number of suitable sound systems, including but not limited to the speakers 136 and/or one or more sets of headphones 140. The amplifier and/or electronics (including speakers 136) may be positioned within the guitar tower 114 but may also be positioned in other suitable locations adjacent to the guitar tower 114, as well. All electrical connections should go directly into connectors in the guitar tower 114 to minimize "cable sprawl" and present a clean, professional appearance.

The headphones 140 may be positioned on any suitable hook or holder. Headphones 140 may be used by a customer for silent practice/play but may also be used by the kiosk attendant and/or passersby who wish to stop and listen to the customer and/or attendant play the guitar 10. The headphones 140 may be wireless and/or wired. The amplifier and/or electronics may be powered via traditional line power (e.g., 110 v) and/or optionally and/or alternatively powered or augmented via solar power. In one embodiment, only a guitar 10 and wireless headphones 140 may be used by the customer of the guitar kiosk 100 at any or each guitar play station 124*a*-124*b* and/or the media/stage station 126, in accordance with one aspect of the present invention.

The I/O panel 142 may include a variety of input and/or output jacks for connecting the guitar 10, headphones 140, and any additional accessories (e.g., microphone) to the audio system. For example, the input/output panel 142 will preferably include at least one guitar input jack for connecting the guitar 10 to the audio system, at least one headphone input jack for connecting headphone 140 with the audio system, and at least one computer input jack for connecting the computer 144 (iPad/tablet) to the audio system. The computer 144 may comprise any suitable computing system, including (but not limited to) an iPad, tablet, etc., for running any number of suitable software applications ("apps") to help facilitate the use of the in-airport guitar kiosk 100 by customers and/or management of the in-airport guitar kiosk 100 by staff hired to run, administer and/or operate the kiosk 100. Such apps may include, but are not limited to, any number of commercially available or proprietary software applications ("apps") to facilitate practice or play, such as Garage Band, Yousician™, Ultimate Guitar™, Chord Bank™ Amplitube™, etc., Guitar accessories include the iRig by IK Multimedia (see https://www.ikmultimedia.com/, which are incorporated herein).

While it's contemplated to have wired connections (that is, via input cables such as guitar cables, headphone cables, and computer/iPad/tablet cables), it is also contemplated that one or more of these may be accomplished via wireless technology. For example, the guitar input jack on the input/output panel 142 may accept a wireless receiver (with ¾" input) to communicate with a wireless transmitter plugged into the output of the guitar 10. Additional accessories may include, but are not limited to, microphones, effects pedals/boards for guitar and/or vocals, and/or other musical instruments such as (by way of example only) keyboards, drums, cajon, etc. Accepting multiple instruments may enable the in-airport kiosk 100 to have a broader appeal than just guitars.

Figure 7:
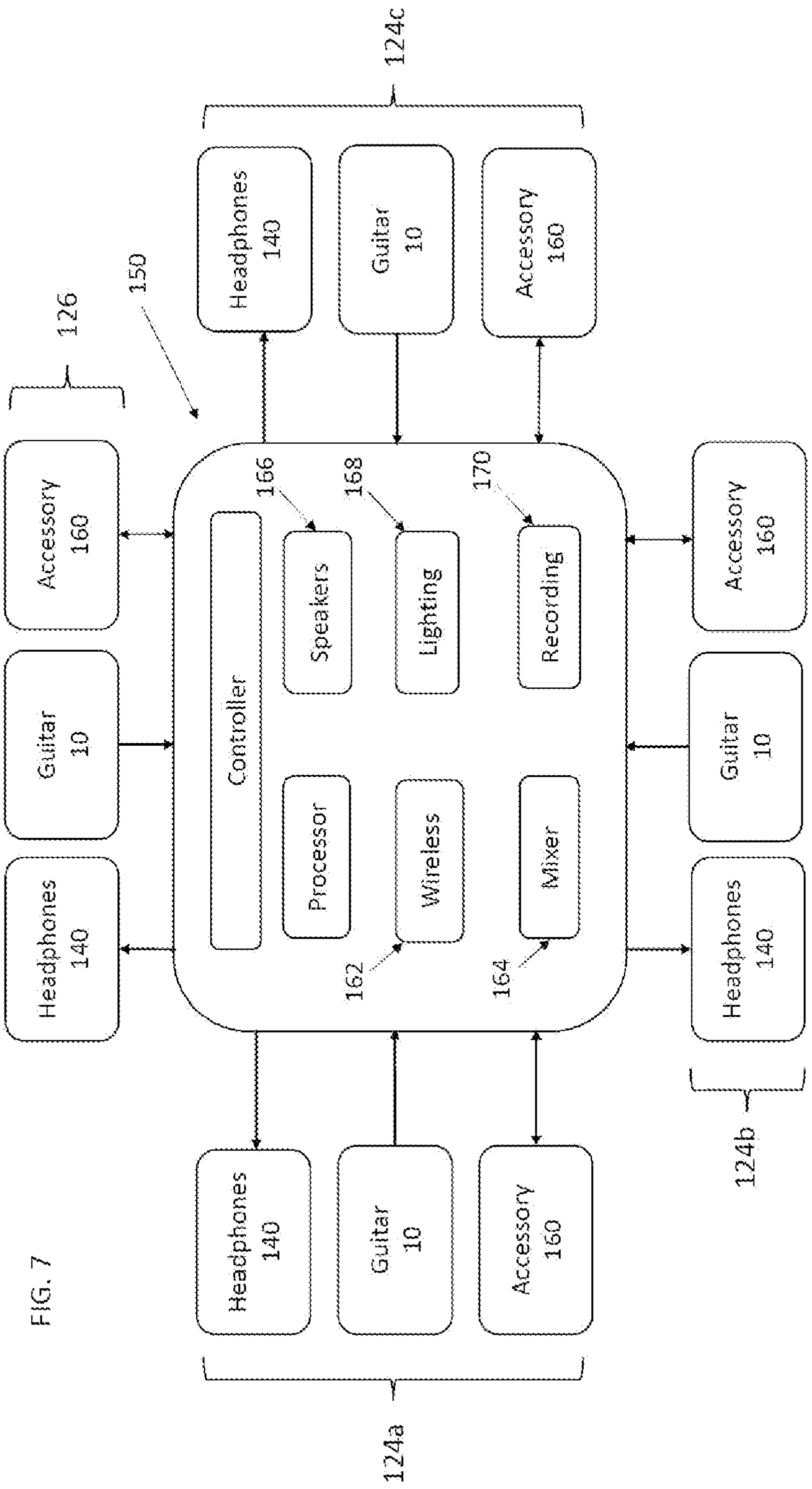
FIG. 7 is a block diagram of an exemplary controller system for controlling the functionality of the in-airport guitar kiosk according to one embodiment of the present invention.

In one embodiment, the in-airport guitar kiosk 100 may be equipped with a central controller system 150 as outlined in the block diagram of FIG. 7. The controller system 150 is configured to be communicatively coupled to a guitar 10, headphones 140, and one or more accessory 160 for each guitar play station 124*a*-124*c* and the media/stage station 126. The accessory 160 may be any component capable of interfacing or influencing the operation of the guitar 10, such as (but not limited to) the computer 142, microphones, effects pedals/boards for guitar and/or vocals, and/or other musical instruments such as (by way of example only) keyboards, drums, cajon, etc. The controller system 150 includes suitable electronics (e.g., a processor and controller) to control communications and functionality between the various modules, including a wireless module 162, a mixer module 164, a speaker module 166, a lighting module 168, and a recording module 170. The wireless module 162 enables wireless communication with the guitar 10, headphones 140, and/or accessories 160. The mixer module 164 enables multiple audio inputs to be mixed together. The speaker module 166 enables the speakers 136 to be controlled by the player at the respective station and/or an attendant or management of the guitar kiosk 100. The lighting module 168 enables the lighting within the side display cases 130 and top display case 116 to be selectively adjusted (e.g., by an attendant or management of the kiosk 100). The recording module 170 enables the recording of audio and/or video of the audio and/or video obtained of the guitar player during use of the guitar kiosk 100 according to the present invention. The functionality described above may be accessed and controlled via a dedicated panel located on the guitar kiosk 100 (e.g., on or within the guitar tower 114) and/or via a software application (app) on the phone and/or tablet of an attendant and/or remotely via offsite personnel/management of the guitar kiosk 100.

The guitar tower 114 is generally cylindrical and includes multiple side display cases 130, each having a guitar hanger 132 disposed therein for hanging the guitar 10 on display during non-use. Each side display case 130 may be inset within the perimeter of the guitar tower 114, such that the guitar 10 is housed at least partially within the guitar tower 114 while hanging on the guitar holder/hanger 132. For example, the display case 130 may have a depth of ranging from 2" to 5" and include a lockable cover 131 (preferably transparent, such as tempered glass or the like) to enclose and protect the guitar 10 during periods of non-use. The cover 131 may be removable from the display case 130 and/or hinged to the display case 130, in either case to protect and display the guitar 10 while the in-airport guitar kiosk 100 is not in operation (e.g., before hours or after hours).

Optional lighting may be provided within the side display case 130, such as strip LEDs along the inside perimeter, to illuminate the guitar 10 when on display on the hanger 132. The lighting may be weight activated so it turns off when the guitar 10 is removed from the hanger 132 and turns on again when the guitar 10 is returned to the hanger 132. The lighting contemplated herein may be controlled via controls built into or disposed within the guitar tower 114 and/or via remote control (e.g., a software application) under the direction of the kiosk attendant or management. For energy efficiency, it is contemplated to provide motion activation for the lighting in the side display case 130 such that, after hours (i.e., when the kiosk 100 is not open for use) the lighting will only turn on if someone is detected nearby by the motion activation feature.

The top display case 116 is also generally cylindrical and preferably made from a clear material (e.g., plastic or glass) such that the folded guitar 10 is visible to passersby of the in-airport guitar kiosk 100. The top display case 116 also preferably includes a powered turn table 135 that will slowly rotate the folded guitar 10 when desired (e.g., during business hours and optionally after business hours). To further accentuate the folded guitar 10 in the top display case 116, one or more lights 133 are disposed within the top display case 116 to shine on or near some or all of the folded guitar 10 when desired (e.g., during business hours and optionally after business hours). For energy efficiency, it is contemplated to provide motion activation for the lighting and the turn table in the top display case 116 such that, after hours (i.e., when the kiosk 100 is not open for use) the lighting and turn-table will only turn on if someone is detected nearby by the motion activation feature.

Each Stage and Media Station includes the features shown and described in FIG. 3, namely a Video Display and an audio system of the type described above with respect to the Play Stations of FIG. 2. The Video Display can be mounted to Guitar Tower side or positioned at least partially within Side Recess. A Lockable Cover may be provided as part of the Video Display in order to enclose and protect the Video Display during periods of non-use. The Video Display may be used to display certain media (e.g., "Now Playing" signage with the name of the customer) while the customer is playing a guitar, which may be videotaped and shared with the customer to allow customer to share/post on social media.

The present invention also includes a software application ("app") to facilitate the use and/or management of the in-airport guitar kiosk. The app is configured to perform any or all of the following steps, actions, or functions:

- Tuning the guitar
- Teaching tools for practicing or learning to play the guitar
- Inputting or capturing customer information for sales and/or marketing purposes.
- Adjusting the audio controls of the audio system. Certain functions may be adjustable only by an attendant on duty, for example the selector switch, which would prevent a customer from inadvertently or intentionally switching from headphones to speakers and disrupting passersby with loud or unenjoyable music. Other functions may be adjustable by a customer and/or the attendant on duty, such as volume, tone, balance, which would only be experienced by the customer via headphones.

The in-airport kiosks of the present invention may be staffed in order to demonstrate and educate travelers in the airport setting, for example guitarist or those interested in learning to play guitar. The in-airport guitar kiosk provides a "Try Before Buy" opportunity for potential customers, which is important for a product as personal as a guitar. It also supports the focus of forward-thinking airports to "improve the passenger experience" by allowing guitarists and those interested to learn guitar to play before or after flight and relax during what can otherwise be a stressful travel experience. The in-airport guitar kiosk targets guitarists and those interested to learn guitar during the pain points of guitar air travel—namely in the airport. While shown and described herein as a generally cylindrical shaped Guitar Tower, it will be it will be appreciated that the functionality described herein may be used in any number of alternate arrangements or structures, all of which fall within the scope of the present invention.

The in-airport travel guitar kiosk of the present invention serves several important functions. First, it provides guitarists and those interested to learn guitar an opportunity to play guitar while in the airport (e.g., post security) so they can relax before or after their flight and minimize or eliminate the stress level that would otherwise occur due to the current air travel experience. Second, it provides guitarists and those interested to learn guitar an opportunity to try a specially designed travel guitar, which if purchased or rented would allow them to air travel without experiencing the guitar air travel pain-points set forth above, owing to the ability of the specially designed travel guitar to fit in a normal sized backpack that can be stored under seat or in the overhead bin. Third, it has the downstream effect of removing a stressor for other passengers because, as more guitarists learn about and purchase or rent and air travel with the specially designed travel guitars, more overhead bin space will be available for carry-on luggage of non-guitarists (because fewer guitarists will air travel with their traditional guitars).

Figure 8:
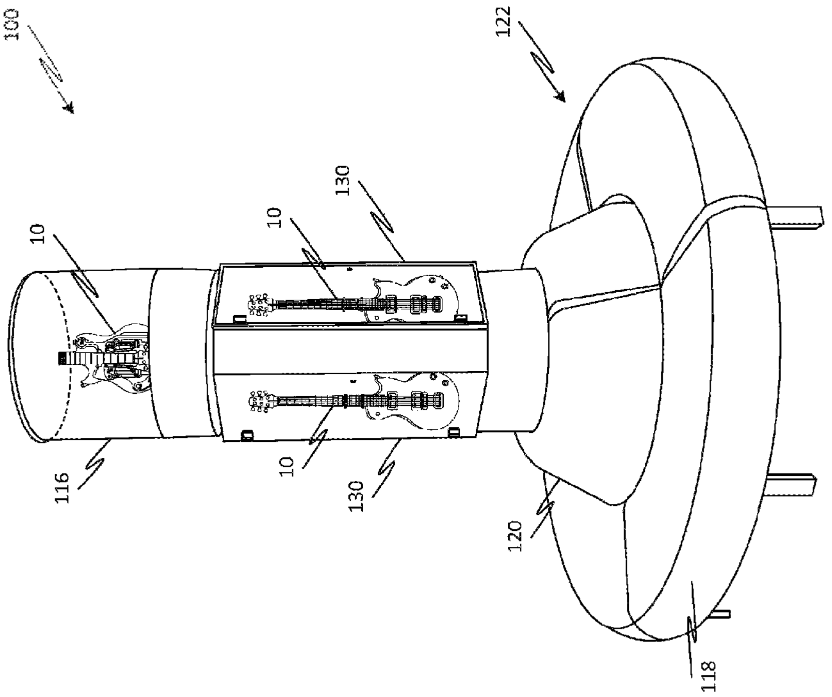
FIGS. 8-10 are illustrations of in-airport guitar kiosk of the type shown in FIGS. 2-4 in use within an airport terminal setting (post-security) according to the present invention.
Figure 9:
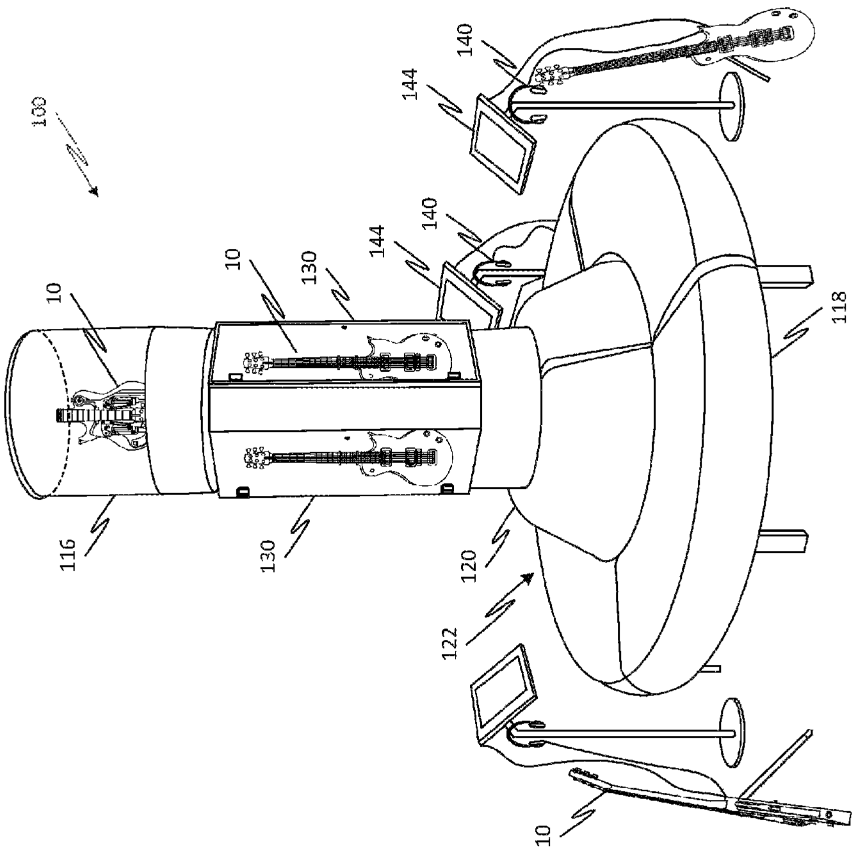
Figure 10:
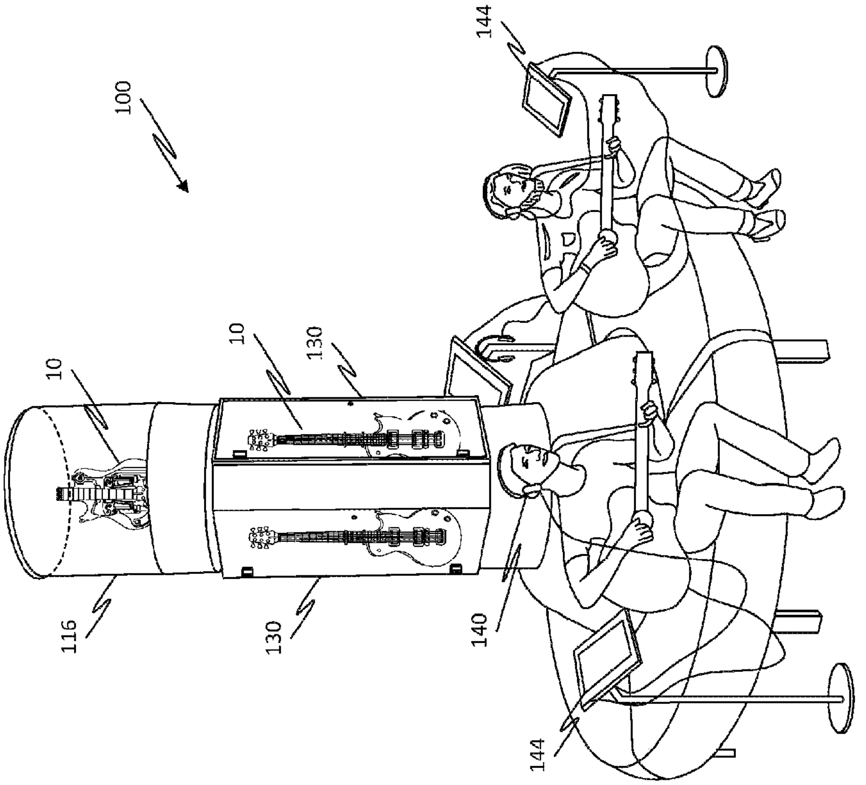

FIGS. 8-10 illustrate one example of the guitar kiosk 100 of the present invention, as used within San Diego Int'l Airport in June 2019. FIG. 8 shows the guitar kiosk 100 with the guitars 10 housed within the side displays 130. FIG. 9 shows multiple guitars 10 deployed on guitar stands and connected to iPads for use by air travelers at San Diego Int'l Airport in June 2019. FIG. 10 shows the guitar kiosk 100 in use by multiple guitarists at San Diego Int'l Airport in June 2019.

The in-airport guitar kiosk of the present invention may include any number of additional features, including (without limitation) those listed below.

Video Display: Enables the name of a customer to be added to the "Now Playing" functionality in the Stage and Media Station during their video capture for social media. The kiosk attendant may also have an iPad mini or similar device (e.g., SmartPhone such as Apple iPhone) such that they can input that via the iPad mini/iPhone and have that wirelessly show up on the video display in the Ciari stage.

Selective Microphones: If customers have headphones 140 on, the attendant can activate a "cut in" feature to be heard within the headphones while the customers are playing. That way, the attendant can ask questions, direct them, etc., without requiring the customer to take the headphones off or raise their voice (may be a pain for passersby if everyone is effectively shouting at the Ciari kiosk). The selective microphone feature can be used with each pair of headphones 140 in the guitar kiosk 100 so the attendant can select the headphones in Play Station 1, 2, or 3 or even the Ciari Stage, as desired.

Silent Disco: The guitar kiosk 100 may incorporate a "silent disco" feature (see https://en.wikipedia.org/wiki/Silent disco) to allow passersby to listen to the music being played at the guitar kiosk 100. The attendant can pass out additional wireless headsets to passersby so they can put them on and enjoy the music being generated at the guitar kiosk 100 that would otherwise be silent and missed by them without the use of the headphones 140. In effect, it would allow a "silent concert" to be hosted at the guitar kiosk 100.

Any of the features or attributes of the above the above-described embodiments and variations can be used in combination with any of the other features and attributes of the above-described embodiments and variations as desired. The in-airport guitar kiosks set forth herein overcome or at least improve upon the disadvantages of the prior art. From the foregoing disclosure and detailed description of certain preferred embodiments, it is also apparent that various modifications, additions, and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An in-airport guitar kiosk, comprising:

at least one location;

a guitar display located adjacent to said at least one seat location;

a guitar hanger disposed in said guitar display for hanging a guitar within said guitar display;

lights disposed within said guitar display for illuminating said guitar display; and electronics for enabling the use of a guitar associated with said at least one seat location.

2. The in-airport guitar kiosk of claim 1, wherein the guitar display includes at least one speaker configured to project sound associated with at least one of a guitar and a microphone.

3. The in-airport guitar kiosk of claim 1, wherein the electronics for enabling the use of a guitar associated with said at least one seat location includes at least one of a pair of wireless headphones and a pair of wired headphones communicatively connected to the guitar.

4. The in-airport guitar kiosk of claim 1, wherein said guitar display includes a transparent cover to enclose and protect a guitar hanging on the guitar hanger during periods of non-use of the guitar.

5. The in-airport guitar kiosk of claim 1, further comprising a controller for controlling at least one of the lights within said at least one guitar display and at least one speaker configured to project sound associated with at least one of a guitar and a microphone.

6. The in-airport guitar kiosk of claim 1, wherein the guitar display includes a top display case for displaying a folded guitar, the top display case is positioned vertically above the at least one seat location.

7. The in-airport guitar kiosk of claim 6, wherein the top display case includes a turntable for selectively rotating the folded guitar.

8. The in-airport guitar kiosk of claim 6, wherein the top display case includes lights for illuminating the folded guitar.

9. The in-airport guitar kiosk of claim 6, further comprising a motion detector to turn off at least one of lights provided within the top display case and a turntable within the top display case when motion is no longer detected in a vicinity of the guitar display.

10. The in-airport guitar kiosk of claim 1, wherein each guitar hanger is weight activated to turn off the lights within the guitar display when a guitar is removed from the guitar hanger.

11. The in-airport guitar kiosk of claim 1, wherein the guitar display includes a controller system configured to be communicatively coupled to at least one of a guitar, a pair of headphones, and an accessory.

12. The in-airport guitar kiosk of claim 11, wherein the accessory includes at least one of a microphone and a guitar effects pedal.

13. The in-airport guitar kiosk of claim 1, further comprising a media station having at least one of a video monitor for displaying media and a video camera for recording video and audio of a customer while performing with a guitar, which video and audio may be shared with the customer after the performance.

14. The in-airport guitar kiosk of claim 5, wherein the controller includes at least one of wireless module, a mixer module, a speaker module, a lighting module, and a recording module.

15. The in-airport guitar kiosk of claim 14, wherein said wireless module enables wireless communication with at least of a guitar, headphones, and an accessory.

16. The in-airport guitar kiosk of claim 14, wherein the mixer module enables multiple audio inputs to be mixed together.

17. The in-airport guitar kiosk of claim 14, wherein the speaker module enables speakers to be controlled by at least one a customer using a guitar play station, an on-site attendant of the guitar kiosk, and off-site manager of the guitar kiosk.

18. The in-airport guitar kiosk of claim 14, wherein the lighting module enables the lighting within each guitar display to be selectively adjusted by at least one of an on-site attendant of the guitar kiosk and an off-site manager of the guitar kiosk.

19. The in-airport guitar kiosk of claim 14, wherein the recording module enables the recording of at least one of audio and video of a customer during use of the guitar kiosk.

20. The in-airport guitar kiosk of claim 14, wherein at least one of the wireless module, lighting module, mixing module, and recording module may be accessed and controlled via at least one of a dedicated panel located on the guitar kiosk and via a software application on at least one of a phone and tablet of at least one of an on-site attendant of the guitar kiosk and an off-site manager of the guitar kiosk.

* * * * *